US010320323B1

(12) United States Patent
Wu

(10) Patent No.: US 10,320,323 B1
(45) Date of Patent: Jun. 11, 2019

(54) PULSE WIDTH MODULATION (PWM) SCHEME FOR SINGLE SHUNT MOTOR CONTROL

(71) Applicant: Infineon Technologies Austria AG, Villach (AT)

(72) Inventor: Wei Wu, Rancho Palos Verdes, CA (US)

(73) Assignee: Infineon Technologies Austria AG (AT)

( * ) Notice: Subject to any disclaimer, the term of this patent is extended or adjusted under 35 U.S.C. 154(b) by 0 days.

(21) Appl. No.: 15/938,631

(22) Filed: Mar. 28, 2018

(51) Int. Cl.
*H02P 21/00* (2016.01)
*H02P 27/08* (2006.01)
*H02P 21/22* (2016.01)
*H02M 7/5387* (2007.01)

(52) U.S. Cl.
CPC ............ *H02P 27/085* (2013.01); *H02P 21/22* (2016.02); *H02M 7/53871* (2013.01)

(58) Field of Classification Search
CPC ............ H02P 21/24; H02P 27/08; H02P 8/12; H02M 7/5395
See application file for complete search history.

(56) References Cited

U.S. PATENT DOCUMENTS

| 5,309,349 | A | 5/1994 | Kwan |
| 5,969,958 | A | 10/1999 | Nielsen et al. |
| 6,642,690 | B2 | 11/2003 | Kim |
| 6,735,537 | B2 | 5/2004 | Liu et al. |
| 6,914,409 | B2 | 7/2005 | Nukushima |
| 7,193,388 | B1 | 3/2007 | Skinner et al. |
| 7,898,210 | B2 | 3/2011 | Hsieh et al. |
| 8,605,461 | B2 | 12/2013 | Hibino |
| 2018/0226913 | A1* | 8/2018 | Hatakeyama ......... H02M 1/084 |

OTHER PUBLICATIONS

"Space Vector Modulation", Wikipedia, Retrieved Feb. 21, 2018, from https://en.wikipedia.org/wiki/Space_vector_modulation. 3 pgs.
Freescale Semiconductors, "PMSM Vector Control with Single-Shunt Current-Sensing Using MC56F8013/23", Design Reference Manual, Document No. DRM102 Rev. 0 Apr. 2008. 72 pgs.

* cited by examiner

*Primary Examiner* — Karen Masih
(74) *Attorney, Agent, or Firm* — Design IP

(57) ABSTRACT

A power module configured to supply a multi-phase current to a multi-phase load is provided. The power module includes an inverter circuit configured to generate a plurality of phase currents that contribute to the multi-phase current and an output voltage based on a plurality of pulse width modulation (PWM) signals; and a control unit configured to generate the plurality of PWM signals to control a plurality of phases based on space vector modulation and modulate the multi-phase current to generate a voltage space vector that is representative of the output voltage and which rotates through a plurality of PWM sectors of a space vector coordinate system. The control unit is configured to regulate a shifting pattern of the plurality of PWM signals during a zero vector switching period such that the shifting pattern is fixed for all of the plurality of PWM sectors as the voltage space vector rotates therethrough.

20 Claims, 7 Drawing Sheets

FIG 2A

| Vector | U+ | V+ | W+ | U- | V- | W- | Vuv | Vvw | Vuw | |
|---|---|---|---|---|---|---|---|---|---|---|
| $V_0=\{000\}$ | OFF | OFF | OFF | ON | ON | ON | 0 | 0 | 0 | zero vector |
| $V_1=\{100\}$ | ON | OFF | OFF | OFF | ON | ON | $+V_{dc}$ | 0 | $+V_{dc}$ | active vector |
| $V_2=\{110\}$ | ON | ON | OFF | OFF | OFF | ON | 0 | $+V_{dc}$ | $+V_{dc}$ | active vector |
| $V_3=\{010\}$ | OFF | ON | OFF | ON | OFF | ON | $-V_{dc}$ | $+V_{dc}$ | 0 | active vector |
| $V_4=\{011\}$ | OFF | ON | ON | ON | OFF | OFF | $-V_{dc}$ | 0 | $-V_{dc}$ | active vector |
| $V_5=\{001\}$ | OFF | OFF | ON | ON | ON | OFF | 0 | $-V_{dc}$ | $-V_{dc}$ | active vector |
| $V_6=\{101\}$ | ON | OFF | ON | OFF | ON | OFF | $+V_{dc}$ | $-V_{dc}$ | 0 | active vector |
| $V_7=\{111\}$ | ON | ON | ON | OFF | OFF | OFF | 0 | 0 | 0 | zero vector |

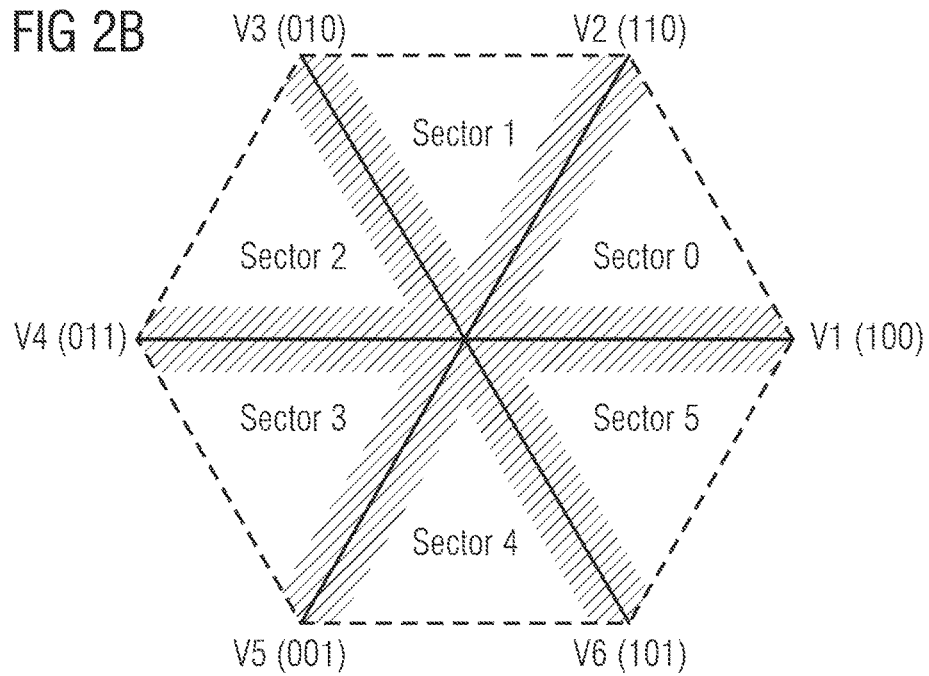

FIG 2B

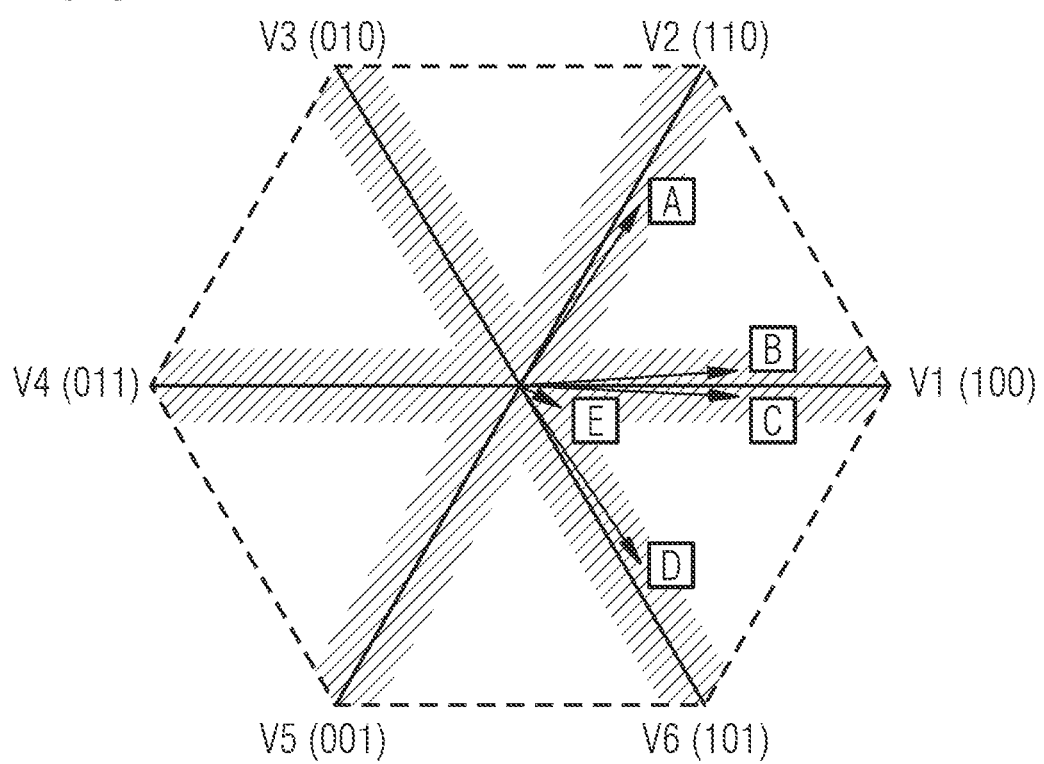

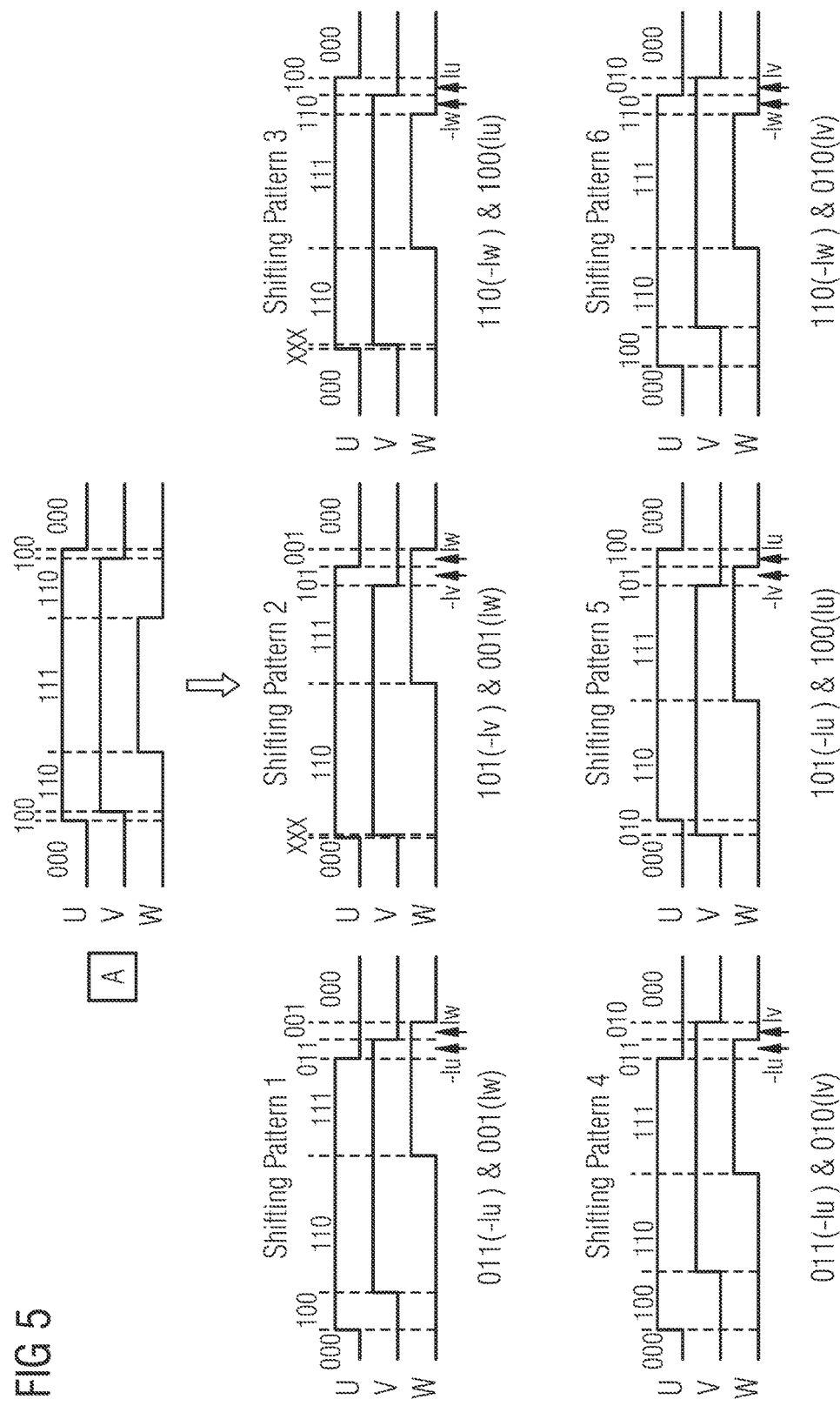

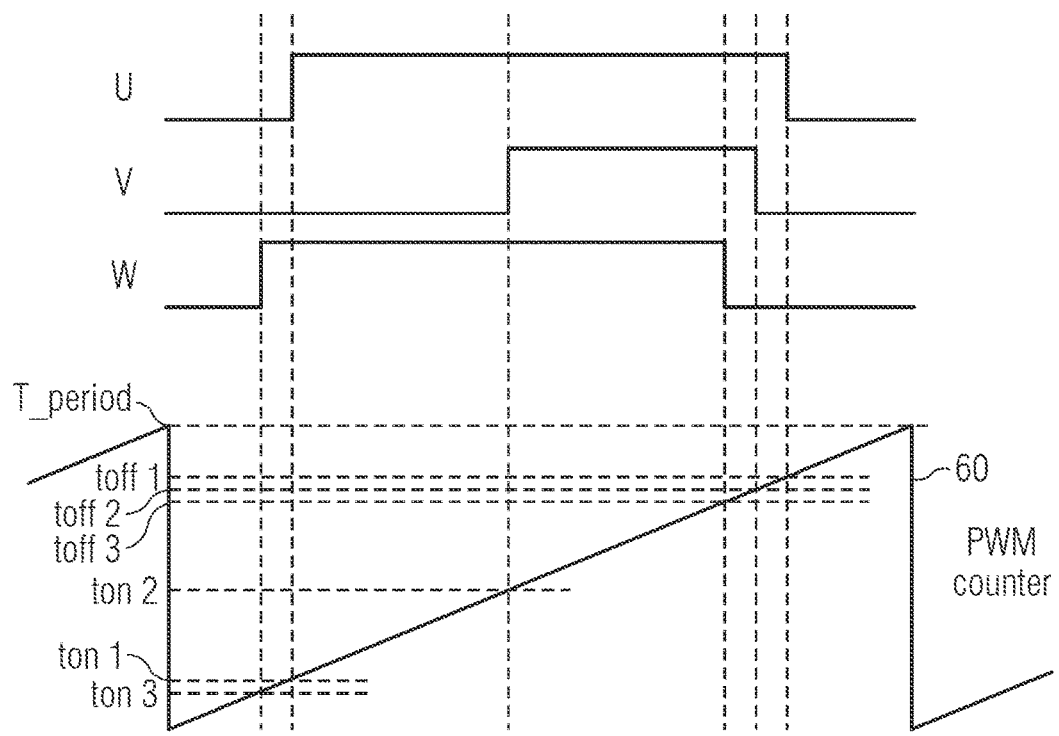

PULSE WIDTH MODULATION (PWM) SCHEME FOR SINGLE SHUNT MOTOR CONTROL

FIELD

The present disclosure relates generally to power inverters, and, more particularly, to a pulse width modulation scheme for signal-shunt motor control.

BACKGROUND

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state.

In Field Oriented Control (FOC) of a three-phase motor, the motor phase current needs to be measured. In order to reduce system cost, some applications use only one shunt resistor (i.e., a single shunt) placed on negative direct current (DC) link and then use software to re-construct the three-phase current. With a standard space vector pulse width modulation (SVPWM) scheme, if the on time (t_on) or off time (t_off) between two motor phases are too close (hereinafter "narrow pulse"), single shunt current sensing will not be able to sense the motor current correctly because there is not enough time for the two phases to stabilize. This limitation affects the motor control performance especially during motor start or at low running speeds.

SUMMARY

Embodiments provide a power module configured to supply a multi-phase current to a multi-phase load. The power module includes an inverter circuit configured to convert a direct current to the multi-phase current by changing respective switching states of a plurality of switching devices that are configured to generate a plurality of phase currents that contribute to the multi-phase current, where the inverter circuit generates an output voltage based on a plurality of pulse width modulation (PWM) signals. The power module further includes a control unit, including at least one processor, coupled to the inverter circuit, the control unit configured to generate the plurality of PWM signals, one for each phase of the multi-phase load, to control a plurality of phases based on space vector modulation and modulate the multi-phase current to generate a voltage space vector that is representative of the output voltage, where the voltage space vector is configured to rotate through a plurality of PWM sectors of a space vector coordinate system while the multi-phase current is supplied to the multi-phase load. The control unit is further configured to regulate a shifting pattern of the plurality of PWM signals during a zero vector switching period such that the shifting pattern is fixed for all of the plurality of PWM sectors as the voltage space vector rotates through a plurality of PWM sectors.

Embodiments provide a method of supplying a multi-phase current to a multi-phase load, the method includes converting a direct current to the multi-phase current by generating a plurality of phase currents that contribute to the multi-phase current; generating a plurality of PWM signals, one for each phase of the multi-phase load, to regulate a output voltage, to control a plurality of phases based on space vector modulation, and to modulate the multi-phase current to generate a voltage space vector that is representative of the output voltage; supplying the multi-phase current to the multi-phase load such that the voltage space vector rotates through a plurality of PWM sectors of a space vector coordinate system; and regulating a shifting pattern of the plurality of PWM signals during a zero vector switching period such that the shifting pattern is fixed for all of the plurality of PWM sectors as the voltage space vector rotates through a plurality of PWM sectors.

BRIEF DESCRIPTION OF THE DRAWINGS

Embodiments are described herein making reference to the appended drawings.

FIG. 2A shows a table illustrating possible switching vectors V0 through V7 according to one or more embodiments;

FIG. 2B shows a hexagonal diagram of space vectors and voltage vectors projected onto a α,ß-coordinate system according to one or more embodiments;

FIG. 3 shows a hexagonal diagram of space vectors and voltage vectors projected onto a α,ß-coordinate system, and examples of different output voltage vectors according to one or more embodiments;

FIG. 5 is a diagram illustrating different possible shifting patterns for a PWM waveform according to one or more embodiments; and FIG. 6 is a diagram illustrating a t_on/t_off time calculation and PWM output generation according to one or more embodiments.

DETAILED DESCRIPTION

Figure 1A:
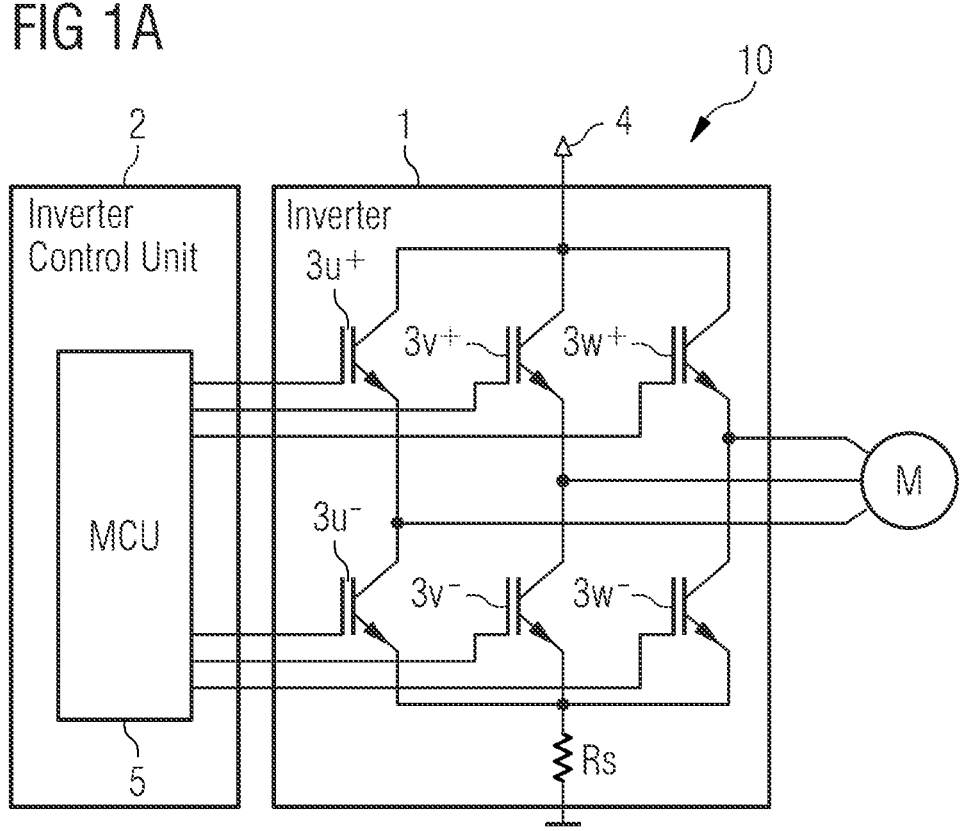
FIG. 1A is a schematic block diagram illustrating a motor control loop of a power semiconductor device according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "front", "behind", "back", "leading", "trailing", "below", "above" etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may, for example, be a current or a voltage at a shunt resistor in a single-shunt resistor system.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

A "power semiconductor device" as used herein may be a semiconductor device on one or more chips with one or more semiconductor components (e.g., transistors), and may include high voltage blocking and/or high current-carrying capabilities. In other words, a power semiconductor device may be intended for high current, typically in the Ampere range, e.g., up to several ten or hundred Ampere, and/or high voltages, typically above 15 V, more typically 100 V and above.

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more active power semiconductor cells, such as a monolithically integrated diode cell, and/or a monolithically integrated transistor cell. Such diode cell and/or such transistor cells may be integrated in a power semiconductor module.

Power semiconductor devices that include transistors which are suitably connected to form half-bridges are commonly used in the field of power electronics. For example, half-bridges may be used for driving electric motors or switched mode power supplies.

For example, a multi-phase inverter is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third the period. Due to the phase difference, the voltage on any conductor reaches its peak at one third of a cycle after one of the other conductors and one third of a cycle before the remaining conductor. This phase delay gives constant power transfer to a balanced linear load. It also makes it possible to produce a rotating magnetic field in an electric motor.

In a three-phase system feeding a balanced and linear load, the sum of the instantaneous currents of the three conductors is zero. In other words, the current in each conductor is equal in magnitude to the sum of the currents in the other two, but with the opposite sign. The return path for the current in any phase conductor is the other two phase conductors. The instantaneous currents result in a current space vector.

A three-phase inverter includes an three inverter legs, one for each of the three phases, and each inverter leg is connected to a direct current (DC) voltage source in parallel to each other. Each inverter leg includes a pair of transistors, for example, arranged in a half-bridge configuration for converting DC to AC. In other words, each inverter leg includes two complementary transistors (i.e., a high-side transistor and a low-side transistor) connected in series and which switch on and off complementary to the each other for driving a phase load. However, multi-phase inverters are not limited to three phases, and may include two phases or more than three phases, with an inverter leg for each phase.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage Vds may be substituted for the IGBT's collector-emitter voltage Vce in any one of the examples described herein. Thus, any IGBT module may be substituted by a MOSFET module and vice versa.

FIG. 1A is a schematic block diagram illustrating a motor control loop 10 of a power semiconductor device according to one or more embodiments. In particular, the motor control loop 10 includes a power inverter 1 and an inverter control unit 2. The motor control loop 10 is further coupled to a three-phase motor M, that includes three phases U, V, and W. The power inverter 1 is a three-phase current generator configured to provide three-phase power by supplying three phase currents to drive the motor M. It will be further appreciated that the power inverter 1 and the inverter control unit 2 may be placed on a same circuit board, or on separate circuit boards.

The power inverter 1 includes a switching array of six transistor modules $3_{u+}$, $3_{u-}$, $3_{v+}$, $3_{v-}$, $3_{w+}$, and $3_{w-}$ (collectively referred to as transistor modules 3) arranged in complementary pairs. Each complementary pair constitutes one inverter leg that supplies a phase current to the three-phase motor M. Thus, each inverter leg includes an upper (high-side) transistor module 3 and a lower (low-side) transistor module 3. Each transistor module may include one transistor, and may also include a diode (not shown). Thus, each inverter leg includes an upper transistor and a lower transistor. Load current paths U, V, and W extend from an output of each inverter leg (i.e., the output of each half-bridge) located between complementary transistors and are configured to be coupled to a load, such as motor M. The power inverter 1 is coupled to a DC power supply 4 (e.g., a battery) and to the inverter control unit 2.

The inverter control unit 2 includes a inverter control circuit and driver circuit for controlling the switching array. For example, the inverter control unit 2 includes a microcontroller unit (MCU) 5 that behaves as a driver unit for generating driver signals for controlling the transistors of each transistor module 3. Thus, load current paths U, V, and W may be controlled by the MCU 5 by means of controlling the control electrodes, sometimes referred to as gate electrodes, of the transistors. For example, upon receiving a corresponding control signal from the MCU 5, a control electrode may set the corresponding transistor in one of a conducting state (i.e., on-state) or a blocking state (i.e., off-state).

The inverter driver board 2 or the MCU 5 itself may include a pulse width modulation (PWM) controller, an ADC, a DSP, and/or a clock source (i.e., a timer or counter) used in implementing a PWM scheme for controlling the states of each transistor, and, ultimately, each phase current provided on the respective load current paths U, V, and W.

In particular, the MCU 5 may use a motor control algorithm, such as a field-oriented control (FOC) algorithm, that controls the de-coupled current on D and Q axes. In particular, the FOC algorithm is used by the MCU 5 for a current control for each phase current output to a multiphase load, such a multiphase motor. Motor speed may further be controlled by adding a speed control loop (not shown) on top of FOC control. Thus, FOC may be considered as an inner control loop and a speed control loop may be considered as an outer control loop. In some cases, motor position may be controlled using a third control loop (e.g., a position control loop) outside of the speed control loop.

During FOC, a motor phase current needs to be measured such that an exact rotor position can be determined. To implement the determination of the motor phase current, the MCU 5 may employ an algorithm (e.g., space vector modulation (SVM), also referred as space vector pulse width modulation (SVPWM)) that uses single-shunt current sensing.

Figure 1B:
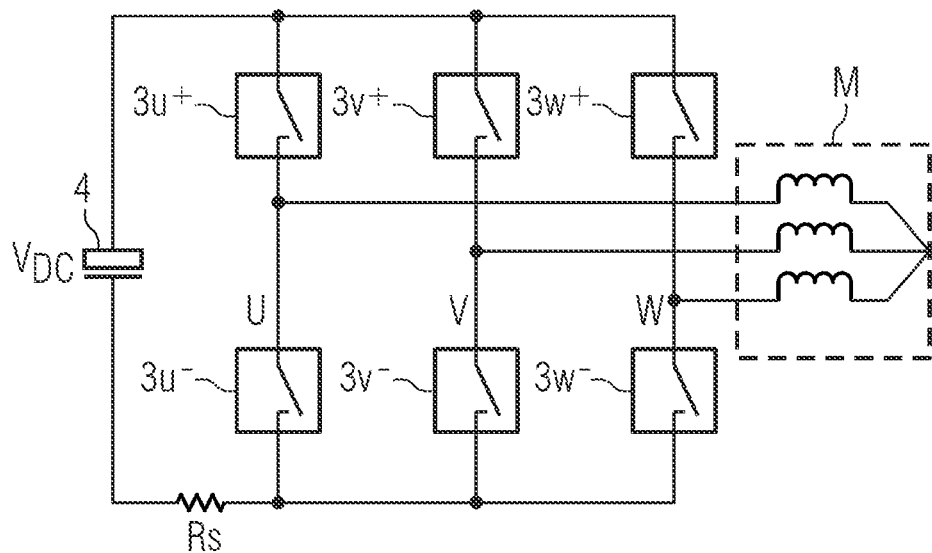
FIG. 1B is a schematic diagram illustrating a power inverter utilizing single-shunt current sensing according to one or more embodiments.

FIG. 1B is a schematic diagram illustrating a power inverter 1 utilizing single-shunt current sensing according to one or more embodiments. In particular, the power inverter 1 includes a shunt resistor Rs placed on negative DC link of the power inverter 1. The transistors $3_{u+}$, $3_{u-}$, $3_{v+}$, $3_{v-}$, $3_{w+}$, and $3_{w-}$ are represented as switches and the motor M is shown with a winding for each of its phases. The MCU 5 in FIG. 1A may receive samples of the current taken from the shunt resistor Rs and then use an algorithm (i.e., software) to re-construct the three-phase current.

For example, SVPWM is a vector control based algorithm that requires the sensing of the (three) motor phase currents. By using the single-shunt resistor Rs, DC-link current pulses are sampled at exactly timed intervals. A voltage drop on the shunt resistor Rs may be is amplified by an operational amplifier inside inverter control unit 2 and shifted up, for example, by 1.65V. The resultant voltage may be converted by an ADC inside inverter control unit 2. Based on the actual combination of switches, the three-phase currents of the motor M are reconstructed using the SVPWM algorithm. The ADC may measure the DC-link current during the active vectors of the PWM cycle. In each sector, two phase current measurements are available. The calculation of the third phase current value is possible because the three winding currents sum to zero.

SVPWM itself is a an algorithm for the control of PWM. It is used for the creation of AC waveforms, and may be used to drive three-phase AC powered motors at varying speeds from a DC source using multiple class-D amplifiers (e.g., transistors). While the examples herein are described in the context of three-phase motors, the examples are not limited thereto an may be applied to any multi-phase load scheme.

As described above, switches (i.e., transistors) of the power inverter 1 are controlled so that at no time are both switches in the same inverter leg are turned on or else the DC supply would be shorted. This requirement may be met by the complementary operation of the switches within an inverter leg. This leads to eight possible switching vectors for the power inverter 1, V0 through V7 with six active switching vectors and two zero vectors.

FIG. 2A shows a table illustrating the possible switching vectors V0 through V7 according to one or more embodiments. In particular, the table shows the switching states for each switch, where the letter U, V, and W designates the inverter leg, and (+) or (−) indicates whether the switch is at high-side or low-side of the inverter 1, respectively. The phase output voltages Vuv, Vvw, and Vuw vary as a pulsed sinusoid, with each inverter leg offset by 120 degrees of phase angle. The combination of ON/OFF states in the power stage (inverter) switches for each voltage vector is coded in a three-digit binary code. Each digit represents one phase. For each phase, a value of one means that the upper switch is ON and the bottom switch is OFF. A value of zero means that the upper switch is OFF and the bottom switch is ON. Thus, the eight possible switching vectors are represented as 000, 100, 110, 010, 011, 001, 101, and 111, where 000 and 111 are the two zero vectors. The rest are the six active switching vectors that are separated by 60 degrees, during which current sensing of the motor phase current can be measured.

FIG. 2B shows a hexagonal diagram of space vectors and voltage vectors projected onto a α,ß-coordinate system according to one or more embodiments. The hexagon represents the total possible output voltage vector area. In particular, each switching vector from the table shown in FIG. 2A is defined in α,ß-coordinates, with the two zero vectors not being shown since they are zero. Based on the six active switching vectors that define six sectors, Sectors 0-5. In each sector, two phase current measurements are available, with the calculation of the third phase current value being possible because the three winding currents sum to zero.

The DC-bus current and voltage are sampled with an ADC. The ADC sampling is triggered by a timer or counter in the MCU 5 and synchronized to the PWM signal. A digital filter may be applied to the sampled values. The three-phase motor current (i.e., the motor phase current) may then be reconstructed from samples taken from the DC-link shunt resistor. The constructed three-phase motor current is then used by the FOC algorithm. Output from the FOC algorithm of the MCU 5 is a motor voltage space vector, which is transformed by means of space vector modulation into PWM signals. Thus, the MCU 5 uses the determined motor phase current to regulate the PWM signals for controlling the phase currents to the motor and the motor speed in the case of the speed control loop.

Typically, in a forbidden area, at least one of the two active vectors is too narrow such that the ADC is not able to sense the voltage across the shunt resistor Rs for measuring the DC link current (i.e., the sensing window is too short). Thus, none or only one current sample at the single-shunt resistor Rs can be taken while the output voltage resides a forbidden area.

One or more different SVPWM schemes may be used in order to determine the motor phase current. For example, a minimum pulse limit scheme may be used. Here, all the narrow pulses (i.e., where the amplitude modulation index is low such that a sampling interval is too short) are enlarged so that single shunt current sensing is possible. Under this scheme, the output voltage is altered and a "forbidden area" of SVPWM is created. FIG. 2B shows locations of the forbidden areas which occur in a region adjacent to an active switching vector (i.e., in a transition area or sector border between sectors).

In another SVPWM scheme, a phase shift PWM motor control method may be implemented. Here, the SVPWM is shifted in order to enlarge the pulse width between time t_on or time t_off of different phases. That is, two PWM pulses are shifted in order to obtain enough time for current sampling. This method does not alter the output voltage, which improves the motor start and low speed performance. However, phase vector modulation naturally causes the PWM pattern in each sector to shift differently such that the shifting patterns in each sector are different. The change in the shifting pattern across sectors may cause acoustic noise. This acoustic noise is more noticeable when the DC bus voltage is high, or the motor M is running at lower speed. Thus, motor control may be limited at low motor speeds, or may not be possible at motor speeds that are below a speed threshold.

In another SVPWM scheme, uses a phase shift PWM motor control method but additionally forces the shifting pattern to be fixed (i.e., a fixed shifting pattern) for all PWM sectors (Sectors 0-5) so that so that acoustic noise caused by pattern change can be reduced or avoided entirely. This method also does not alter the output voltage.

When the shifting pattern is fixed for all sectors, the maximum PWM (amplitude) modulation index will be limited. So this PWM scheme may be limited to a start phase of the motor or to lower motor speeds that do not require a high output voltage.

The MCU 5 may be configured to switch to a different PWM scheme, such as those described above, when an output voltage above a threshold is required to drive the motor. In this way, a higher PWM modulation index may be achieved on an as needed basis.

Still, by fixing the shifting pattern for all sectors, current sensing in forbidden areas and/or during a narrow pulse is possible and the acoustic noise issue at lower motor speeds, which does not require high output voltage, may be addressed. Thus, motor speed control and feedback performance (i.e., based on the measured multi-phase current) may be improved over the previous SVPWM scheme, especially at lower motor speeds due to the reduction or elimination of acoustic noise (i.e., substantially eliminated acoustic noise), and may further include motor control at speeds that are below the above-mentioned speed threshold.

FIG. 3 shows a hexagonal diagram of space vectors and voltage vectors projected onto a α,ß-coordinate system, and examples of different output voltage vectors according to one or more embodiments. The output voltage vectors A-E represent possible output voltages, including their vector positions, of the inverter 1, and ultimately represent the rotor position of the motor M as the output voltage vector rotates through Sectors 0-5. That is, voltage space vector rotates through the sectors at a rotation voltage output angle. Each output voltage vector A-E is located in a forbidden area and/or is a narrow pulse with a low modulation index. Thus, making it difficult or impossible to perform current sensing using a single-shunt resistor Rs under traditional PWM schemes. However, by fixing a shifting pattern for all sectors, current sensing in forbidden areas and/or during a narrow pulse using a single-shunt resistor Rs is possible.

Figure 4A:
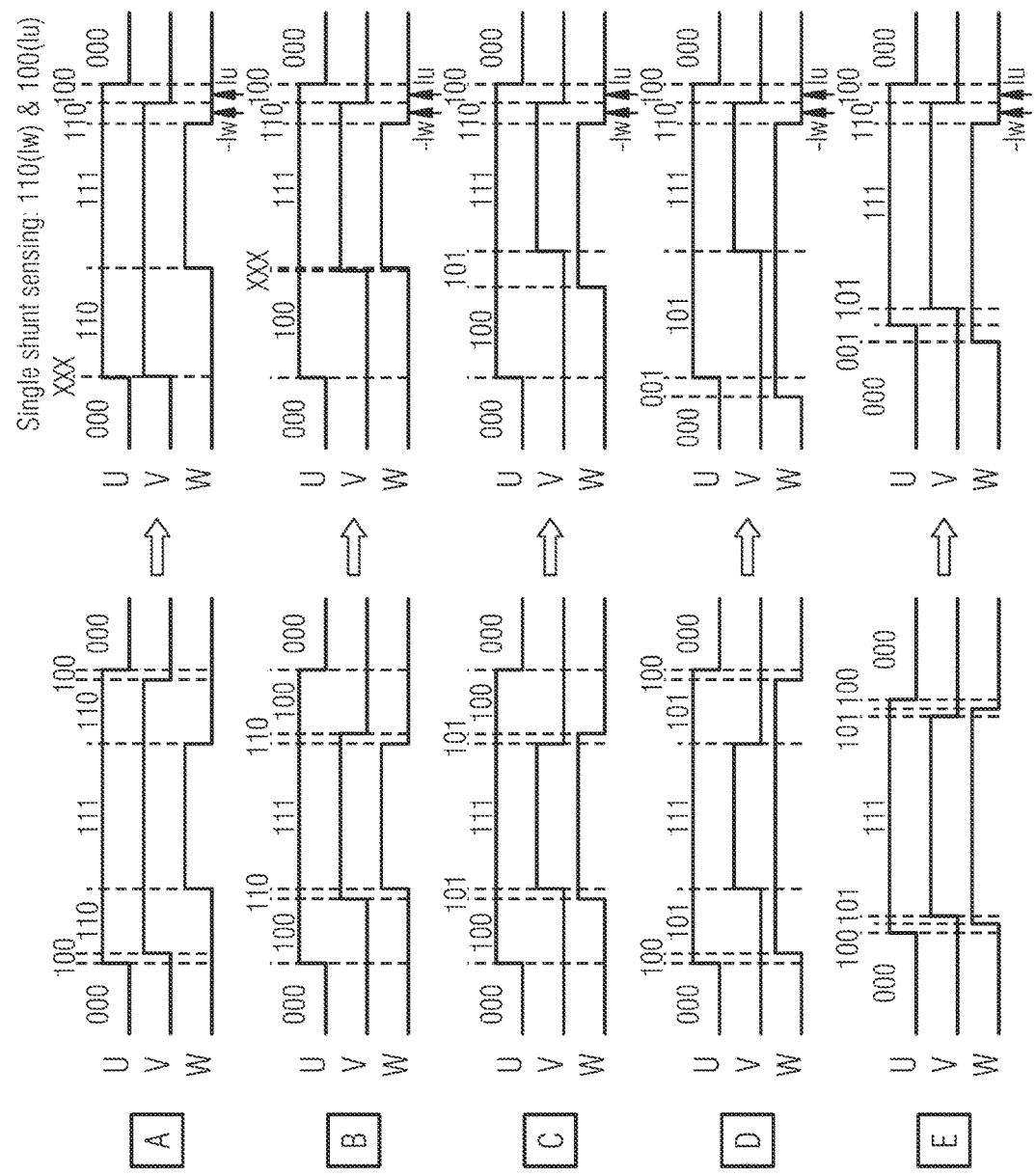
FIG. 4A is a diagram illustrating different PWM waveforms A-E without any shifting (left) and different PWM waveforms A-E with a fixed shifting pattern SVPWM scheme (right)

FIG. 4A is a diagram illustrating different PWM waveforms A-E without any shifting (left) and different PWM waveforms A-E with a fixed shifting pattern SVPWM scheme (right). Each PWM waveform A-E on the left is an original, non-shifted PWM waveform that includes the modulated PWM signals for each phase. Thus, each PWM waveform A-E is formed by the PWM outputs (pulses) for each output phase U, V, and W. The shifted PWM waveforms A-E each include one or more shifted PWM signals of the original PWM waveform A-E, respectively.

In particular, each PWM waveform is formed by two active switching vectors, which the output voltage vector lies between (e.g., 100 and 110), and the two zero switching vectors (i.e., 000 and 111). As noted above, since output voltage vectors A-E are located in a forbidden area, at least one of the two active vectors is too narrow such that the ADC is not able to sense the voltage across the shunt resistor Rs for measuring the DC link current (i.e., the sensing window is too short). Thus, a fixed shifting pattern SVPWM scheme may be used to make current sensing in these forbidden areas possible.

Turning back to FIG. 4A, the PWM waveforms A-E on the left are the original waveforms for obtaining a desired output voltage vector without any shifting, and the PWM waveforms A-E using the fixed shifting pattern SVPWM scheme, with a fixed shifting pattern for all sectors, is shown in on the right side of FIG. 4A.

Figure 4B:
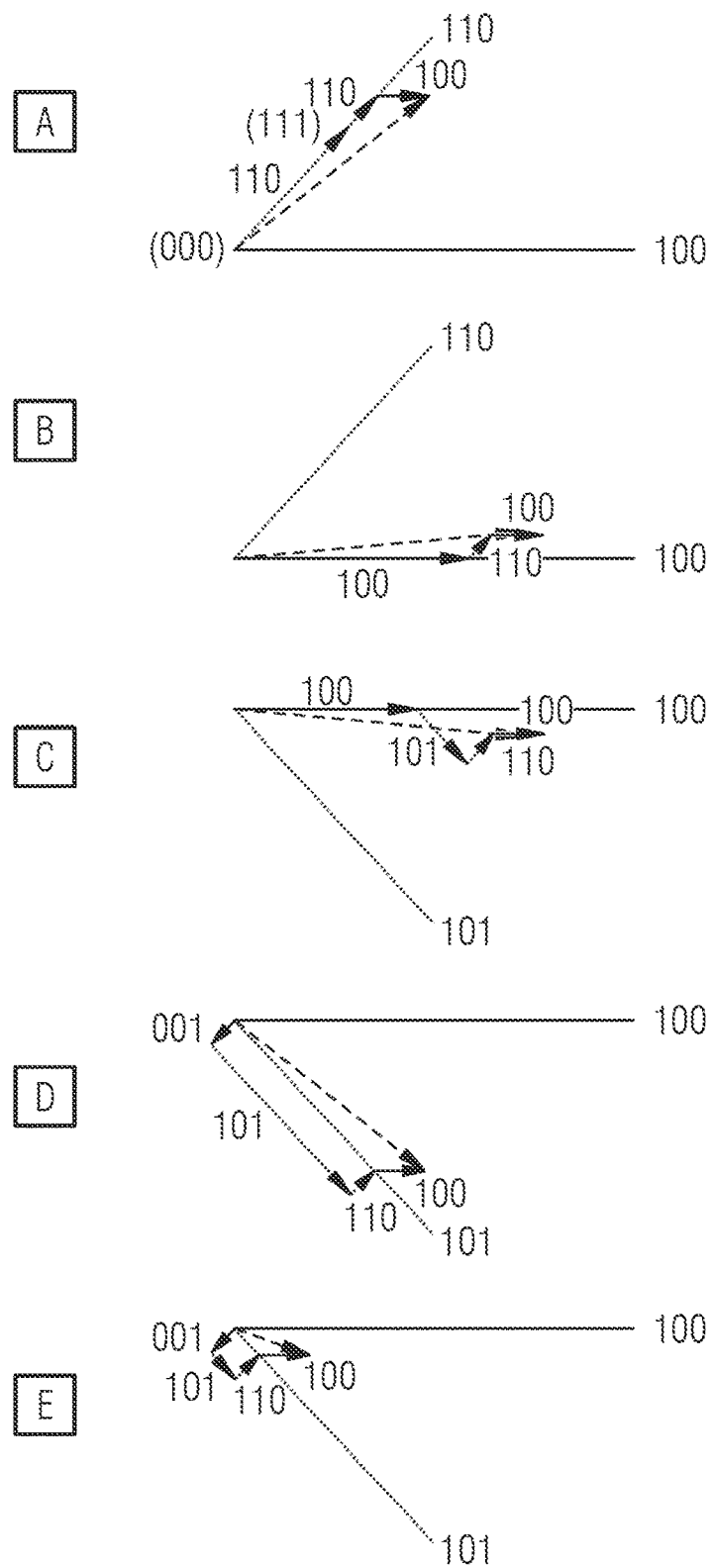
FIG. 4B shows a resultant output voltage vector under the fixed shifting pattern SVPWM scheme for each shifted PWM waveform shown in FIG. 4A.

FIG. 4B shows a resultant output voltage vector under the fixed shifting pattern SVPWM scheme for each shifted PWM waveform shown in FIG. 4A. The resultant output voltage vector for each example A-E in FIGS. 4A and 4B corresponds to a output voltage vector A-E shown in FIG. 3. Thus, examples A-E represent different possible output voltages (see FIGS. 3 and 4B) that may be generated by the inverter 1 based on the control from the MCU 5, and the PWM waveforms in FIG. 4A for achieving those output voltages.

According to the PWM waveforms shown in FIG. 4A, each PWM waveform A-E is a pattern made up of different regions that represent the switch states of the switches (i.e., transistors) in the inverter 1. For example, under the traditional SVPWM scheme using waveform A, the switch states transition from 000, 100, 110, 111, 110, 100, 000, defining six possible regions within the PWM pattern.

Under the traditional PWM waveform A, switch state 100 (i.e., the voltage vector for 100) is too narrow for current sensing. Similarly, in the traditional PWM waveforms B, C, D, and E, switch states 110 (B), 101 (C), 100 (D), and 100 and 101 (E) are too narrow for current sensing.

According to the fixed shifting pattern SVPWM scheme, the pattern of PWM waveform A, resulting in output voltage vector A, is shifted such that a rising edge of phase U is shifted to the right to coincide with the rising edge of phase V, and the rising edge of phase W is shifted to the right by a same amount as the right-shift of the rising edge of phase U. In addition, the falling edge of phase U is similarly shifted to the right by the same amount, as is the falling edge of phase W. Thus, the rising edge and falling edge of one phase (e.g., U, V, or W) are shifted for at least one of the phases U, V and W. Each shift of a rising or falling edge is fixed at the same amount (i.e., the same amount in time) for a respective phase. By doing so, the average voltage of each phase is maintained without any change, and the output voltage is consequently not altered.

As will be described later, one or more phases U, V and/or W may be shifted such that a same switching sequence during a transition period is maintained for all PWM sectors. This means that one, two, three, or more phases may be pulse-shifted. Two or more phases may be shifted by the same amount, or by different amounts, in the same or in different directions. For example, the V phase may be slightly shifted right, the U phase may be heavily shifted right, and the W phase may be shifted left, shifted right, or not shifted (e.g., see FIG. 4A, example E).

Thus, the shifting of the rising edge and falling edge of one phase (e.g., U, V, or W) may be referred to as a pulse-shift, and provides a window that is long enough for a phase current to be sensed by the ADC that is measuring the voltage (current) across the shunt resistor Rs. Furthermore, by shifting the rising edge and falling edge of another phase (e.g., U, V, or W), another window is provided that is long enough for another phase current to be sensed by the ADC that is measuring the voltage (current) across the shunt resistor Rs. In this example A, shifting the U phase allows the ADC of the inverter control unit 2 to sense the U phase current +Iu, and the shifting of the W phase still allows the ADC to sense the W phase current −Iw.

As indicated by the XXX, switch state 100 might be eliminated due to the shifting. Based on this fixed shifting pattern, the width or window between time t_on or time t_off during switch states 110 and 100 is sufficient for performing single-shunt current sensing, during which a phase current −Iw (i.e., for the W phase) or a phase current +Iu (i.e., for the U phase) is measured, respectively. Although output voltage vector A is in a forbidden area, the two phase currents are still able to be measured at two different voltage vectors (i.e., 110 and 100).

Thus, according to the fixed shifting pattern PWM scheme, the shifting pattern for the t_off time (turn off time) are in the order of phases W→V→U. In this shifting pattern, the PWM vectors available for single-shunt current sensing are vector 110 and 100, which makes it possible to sense the motor phase current on phase W and U, respectively. However, it will be appreciated that single-shunt current sensing may be performed at other active switching vectors under other shifting patterns.

In FIG. 4B, voltage vector patterns are shown where sub-vectors corresponding to a voltage vector of each switch state of the PWM waveform pattern is provided, and a sum of the sub-vectors (i.e., sum of voltage vectors) results in the output voltage vector of the inverter 1. In other words, the mean vector of the PWM period is equal to the desired output voltage vector.

Each sub-vector has a direction corresponding to the active switching vector (V0-V7) that corresponds to the switch state (e.g., switch state 110 has a sub-vector with a direction corresponding to vector V2 (110)), and a magnitude corresponding to the t_on time (on time) of the switch state. The zero switching vectors V0 and V7 have no vector direction or magnitude, and result in no change when determining or influencing the output voltage vector. Each voltage vector pattern A-E corresponds to a respective PWM waveform A-E of the fixed shifting pattern SVPWM scheme shown in FIG. 4A.

The shifting pattern for the PWM waveforms in examples B-E are also the same (fixed) as the shifting pattern used in PWM waveform A (i.e., the shifting pattern for the t_off time (off time) are in the order of phases W→V→U). As shown in FIG. 3, the output voltage vectors A and B are in Sector 0 and the output voltage vectors C, D and E are in Sector 5, yet each PWM waveform for generating each output voltage vector A-E employs a same (fixed) shifting pattern for the turn off of the phase pulses U, V, and W. This shifting pattern remains fixed across all Sectors 0-5.

For example, the same shifting pattern is used for turning off the inverter phases U, V, and W for all PWM sectors. In this example, the t_off times (turn off times) for the phases are in the order of W→V→U, and this pattern is used in each PWM sector. Furthermore, not only is the shifting sequence from W→V→U the same, but the timing between each phase shift is the same for each PWM sector. That is, the window for current sensing (e.g., for sensing current +Iu and current −Iw) is the same size, and is sufficient for the ADC to measure the voltage across the shunt resistor Rs for determining the current. Thus, the original PWM waveforms in FIG. 4A are each shifted in a manner such that the same shifting pattern is achieved at the t_off times (off times) for the phases.

In view of the above, it can be said that a shifting pattern either at a turn-on portion of the PWM waveform (i.e., during which the phases are transitioning from a 0 state to a 1 state) or at a turn-off portion of the PWM waveform (i.e., during which the phases are transitioning from a 1 state to a 0 state) is fixed for each of the PWM sectors. This period of transition from 0 to 1 or from 1 to 0 (i.e., from a first zero vector to a second zero vector) may be referred to as a state transition period, a rising edge transition period, a falling edge transition period, or a zero vector switching period.

It is also noted that the rising and falling edges of a shifted phase U, V, or W are shifted by the same amount (i.e., the same amount to the right or the same amount to the left) so that the average voltage of each phase remains the same as the original PWM waveform. This results in a same effective output voltage as the original PWM waveform such the output voltage vector remains unchanged after the shifting of the PWM pattern is performed.

According to the fixed shifting pattern SVPWM scheme, the pattern of PWM waveform B, resulting in output voltage vector B, is shifted such that the rising edges of phases V and W are shifted to the right, by different amounts, and the falling edges of phases V and W are also shifted to the right by equally different amounts such that the turn off pattern (sequence) of the phases U, V, and W are the same as the fixed shifting pattern of PWM waveform A. By doing so, the average voltage of each phase is maintained without any change, and the output voltage is consequently not altered.

According to the fixed shifting pattern SVPWM scheme, the pattern of PWM waveform C, resulting in output voltage vector C, is shifted such that the rising edges and falling edges of phase V are shifted to the right by a same amount, and the rising edges and falling edges of phase W are shifted to the left by a same amount such that the turn off pattern (sequence) of the phases U, V, and W are the same as the fixed shifting pattern of PWM waveform A. By doing so, the average voltage of each phase is maintained without any change, and the output voltage is consequently not altered.

According to the fixed shifting pattern SVPWM scheme, the pattern of PWM waveform D, resulting in output voltage vector D, is shifted such that the rising edges of phases U and V are shifted to the right, by different amounts, and the falling edges of phases U and V are also shifted to the right by equally different amounts such that the turn off pattern (sequence) of the phases U, V, and W are the same as the fixed shifting pattern of PWM waveform A. By doing so, the average voltage of each phase is maintained without any change, and the output voltage is consequently not altered.

According to the fixed shifting pattern SVPWM scheme, the pattern of PWM waveform E, resulting in output voltage vector E, is shifted such that the rising edges and falling edges of phase U are shifted to the right by a same amount, and the rising edges and falling edges of phase W are shifted to the left by a same amount such that the turn off pattern (sequence) of the phases U, V, and W are the same as the fixed shifting pattern of PWM waveform A. By doing so, the average voltage of each phase is maintained without any change, and the output voltage is consequently not altered.

Alternatively, the shifting pattern of PWM waveform E may be formed by shifting the pulse of the V phase slightly to the right, shifting the pulse of the U phase heavily to the right right, and shifting the pulse of the W phase to the left, to the right, or not at all.

In view of the above, one, two, or all phases may be shifted, right or left, such that a same (fixed) shifting pattern is realized for each PWM waveform regardless of sector in which the output voltage vector resides. That is, the switching pattern (e.g., for phase turn-off or turn-on) is the fixed for all SVPWM sectors.

FIG. 5 is a diagram illustrating different possible shifting patterns for a PWM waveform according to one or more embodiments. In particular, FIG. 5 shows six different shifting patterns 1-6 for shifting the PWM waveform A in FIG. 4A.

According to shifting pattern 1, the pattern or sequence in which the phases are turned off (t_off times) are in the sequential order of phases U→V→W. Thus, all PWM waveforms in all PWM sectors may follow this shifting pattern for achieving a shifted PWM waveform. Here, phase currents −Iu and +Iw are measured for determining the motor phase current.

According to shifting pattern 2, the pattern or sequence in which the phases are turned off (t_off times) are in the sequential order of phases V→U→W. Thus, all PWM waveforms in all PWM sectors may follow this shifting pattern for achieving a shifted PWM waveform. Here, phase currents −Iv and +Iw are measured for determining the motor phase current.

According to shifting pattern 3, which is the same used in FIG. 4A, the pattern or sequence in which the phases are turned off (t_off times) are in the sequential order of phases W→V→U. Thus, all PWM waveforms in all PWM sectors may follow this shifting pattern for achieving a shifted PWM waveform. Here, phase currents −Iw and +Iu are measured for determining the motor phase current.

According to shifting pattern 4, the pattern or sequence in which the phases are turned off (t_off times) are in the sequential order of phases U→W→V. Thus, all PWM waveforms in all PWM sectors may follow this shifting pattern for achieving a shifted PWM waveform. Here, phase currents −Iu and +Iv are measured for determining the motor phase current.

According to shifting pattern 5, the pattern or sequence in which the phases are turned off (t_off times) are in the sequential order of phases V→W→U. Thus, all PWM waveforms in all PWM sectors may follow this shifting pattern for achieving a shifted PWM waveform. Here, phase currents −Iv and +Iu are measured for determining the motor phase current.

According to shifting pattern 6, the pattern or sequence in which the phases are turned off (t_off times) are in the sequential order of phases W→U→V. Thus, all PWM waveforms in all PWM sectors may follow this shifting pattern for achieving a shifted PWM waveform. Here, phase currents −Iw and +Iv are measured for determining the motor phase current.

As can be seen from the shifting pattern and the sensed (measured) phase currents, the first phase current that is sensed corresponds to the first phase in the sequence that switches from high to low, and the second phase current that is sensed corresponds to the third (i.e., last) phase in the sequence that switches from high to low.

In addition, the MCU 5 may select one of the shifting patterns shown in FIG. 5 based on one or more system conditions or parameters. For example, one or more shifting patterns may be more desirable based on an existing voltage vector out or an anticipated demand from the motor. Additionally, one or more shifting patterns may be more desirable for a smoother transition between PWM sectors. Thus, the MCU 5 may select from one of the six shifting patterns and control the PWM controller to use the selected shifting pattern for generating output voltage vectors in all PWM sectors.

FIG. 6 is a diagram illustrating a t_on/t_off time calculation and PWM output generation according to one or more embodiments. Specifically, the inverter control unit 2, and more specifically, the MCU 5, may include a PWM counter used to calculate and trigger the turn on (t_on) and turn off (t_off) times for each inverter leg of the inverter 1 over a PWM period. Six timing thresholds are determined and set by the MCU 5 (e.g., a PWM controller), which includes three on/off time pairs, one for each inverter leg.

For example, ton1 and toff1 represent the turn on and turn off times for the U phase, ton2 and toff2 represent the turn on and turn off times for the V phase, and ton3 and toff3 represent the turn on and turn off times for the W phase. As the waveform 60 of the PWM counter crosses a threshold, a corresponding phase is turned on or off. Thus, turn on and turn off times for each phase are calculated and configured by the MCU 5 based on the selected shifting pattern used by the MCU 5, implemented by a space vector software module of the MCU 5.

Furthermore, the MCU 5 may calculate or determine the output voltage for controlling the PWM controller. The output voltage determined by the MCU 5 can also be compared to a voltage output threshold. If the output voltage meets or exceeds the voltage output threshold, the MCU 5 may switch to a different SVPWM scheme. On the other hand, if the output voltage is below or falls below the voltage output threshold, the MCU 5 may maintain or switch back to the fixed shifting pattern SVPWM scheme.

In view of the above, single-shunt current sensing may operate correctly at any voltage output angle and even when the PWM modulation index is low or close to zero. This may improve motor start performance, enable the motor to run a lower speeds, and result in lower acoustic noise during startup and at low running speeds.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A power module configured to supply a multi-phase current to a multi-phase load, comprising:
    an inverter circuit configured to convert a direct current to the multi-phase current by changing respective switching states of a plurality of switching devices that are configured to generate a plurality of phase currents that contribute to the multi-phase current, wherein the inverter circuit generates an output voltage based on a plurality of pulse width modulation (PWM) signals; and a control unit, including at least one processor, coupled to the inverter circuit, the control unit configured to generate the plurality of PWM signals, one for each phase of the multi-phase load, to control a plurality of phases based on space vector modulation and modulate the multi-phase current to generate a voltage space vector that is representative of the output voltage, wherein the voltage space vector is configured to rotate through a plurality of PWM sectors of a space vector coordinate system while the multi-phase current is supplied to the multi-phase load, and wherein the control unit is configured to regulate a shifting pattern of the plurality of PWM signals during a zero vector switching period such that the shifting pattern is fixed for all of the plurality of PWM sectors as the voltage space vector rotates through the plurality of PWM sectors.

2. The power module of claim 1, wherein:
during the zero vector switching period, the control unit is configured to switch the plurality of PWM signals from a first zero vector value to a second zero vector value based on a switching sequence of the shifting pattern, the switching sequence being the same for all of the plurality of PWM sectors.

3. The power module of claim 2, wherein:
the plurality of PWM signals include a first PWM signal and a second PWM signal, and
according to the shifting pattern, the control unit is configured to switch the first PWM signal at a first switching time and switch the second PWM signal at a second switching time that is a first time period after the first switching time,
the first switching time, the second switching time and the first time period being the same for all of the plurality of PWM sectors.

4. The power module of claim 3, wherein:
the plurality of PWM signals include a third PWM signal, and
according to the shifting pattern, the control unit is configured to switch the third PWM signal at a third switching time that is a second time period after the second switching time,
the third switching time and the second time period being the same for all of the plurality of PWM sectors.

5. The power module of claim 4, wherein:
the first PWM signal is associated with a first phase current of the plurality of phase currents, the second PWM signal is associated with a second phase current of the plurality of phase currents, and the third PWM signal is associated with a third phase current of the plurality of phase currents, and
the control unit is configured to measure the first phase current during the first time period and measure the third phase current during the second time period, and is further configured to determine the multi-phase current based on the measured first phase current and the measured third phase current.

6. The power module of claim 1, wherein:
during the zero vector switching period, the control unit is configured to switch each of the plurality of PWM signals, in a sequential order, from a first binary value that is associated with a first zero vector to a second binary value associated with a second zero vector based on the shifting pattern, wherein the sequential order is the same for all of the plurality of PWM sectors.

7. The power module of claim 6, wherein:
the shifting pattern includes a time period between a first switching time, at which a first PWM signal of the plurality of PWM signals is switched from the first binary value to the second binary value, and a second switching time, at which a second PWM signal of the plurality of PWM signals is switched from the first binary value to the second binary value, and
the first switching time and the second switching time being fixed for all of the plurality of PWM sectors.

8. The power module of claim 2, wherein:
the control unit is configured to time-shift at least one PWM signal of the plurality of PWM signals by shifting a rising edge and a falling edge of the at least one PWM signal such that the plurality of PWM signals switch according to the switching sequence of the shifting pattern in each of the plurality of PWM sectors.

9. The power module of claim 8, wherein:
the inverter circuit is configured to output a plurality of phase voltages, one for each phase of the multi-phase load, each respectively corresponding to one of the plurality of PWM signals, wherein the plurality of phase voltages contribute to the output voltage, and
an average of each phase voltage for each of the at least one time-shifted PWM signal is the same prior to and subsequent to the at least one PWM signal being time-shifted.

10. The power module of claim 2, wherein:
the first zero vector value corresponds to an on-state of the plurality of switching devices and the second zero vector value corresponds to an off-state of the plurality of switching devices.

11. The power module of claim 1, wherein:
the inverter circuit is configured to output a plurality of phase voltages, one for each phase of the multi-phase load, each having a PWM waveform that respectively corresponds to one of the plurality of PWM signals.

12. The power module of claim 1, wherein:
the control unit is configured to manipulate at least one of the plurality of PWM signals based on the shifting pattern to create at least one phase current detection period, and measure a different phase current of the plurality of phase currents during each of the at least one phase current detection period, and
each of the at least one phase current detection period is at a fixed time and duration for all of the plurality of PWM sectors.

13. The power module of claim 1, wherein the inverter circuit further comprises:
a shunt resistor disposed on a negative direct current (DC) link coupled to a DC voltage source, and
the control unit is configured to measure at least one phase current of the plurality of phase currents passing through the shunt resistor during the zero vector switching period, and determine the multi-phase current based on the at least one measured phase current.

14. The power module of claim 1, wherein:
the control unit is configured to select the shifting pattern from among a plurality of shifting patterns based on a load condition of the multi-phase load.

15. The power module of claim 1, wherein:
the multi-phase current is a three-phase current for driving a three-phase motor.

16. A method of supplying a multi-phase current to a multi-phase load, the method comprising:

converting a direct current to the multi-phase current by generating a plurality of phase currents that contribute to the multi-phase current;

generating a plurality of PWM signals, one for each phase of the multi-phase load, to regulate a output voltage, to control a plurality of phases based on space vector modulation, and to modulate the multi-phase current to generate a voltage space vector that is representative of the output voltage;

supplying the multi-phase current to the multi-phase load such that the voltage space vector rotates through a plurality of PWM sectors of a space vector coordinate system; and regulating a shifting pattern of the plurality of PWM signals during a zero vector switching period such that the shifting pattern is fixed for all of the plurality of PWM sectors as the voltage space vector rotates through the plurality of PWM sectors.

17. The method of claim 16, further comprising:

switching, during the zero vector switching period, each of the plurality of PWM signals, in a sequential order, from a first binary value that is associated with a first zero vector to a second binary value associated with a second zero vector based on the shifting pattern, wherein the sequential order is the same for all of the plurality of PWM sectors.

18. The method of claim 17, wherein the plurality of PWM signals include a first PWM signal and a second PWM signal, the method further comprising:

switching, according to the shifting pattern, the first PWM signal at a first switching time and switching the second PWM signal at a second switching time that is a first time period after the first switching time, wherein the first switching time, the second switching time and the first time period being the same for all of the plurality of PWM sectors.

19. The method of claim 18, wherein the plurality of PWM signals include a third PWM signal, the method further comprising:

switching, according to the shifting pattern, the third PWM signal at a third switching time that is a second time period after the second switching time, the third switching time and the second time period being the same for all of the plurality of PWM sectors.

20. The method of claim 16, further comprising:

measuring at least one phase current of the plurality of phase currents passing through a shunt resistor during the zero vector switching period;

determining the multi-phase current based on the at least one measured phase current; and controlling the multi-phase load based on the determined multi-phase current.

* * * * *